United States Patent [19]

Giorgetti

[11] Patent Number: 5,099,893

[45] Date of Patent: Mar. 31, 1992

[54] DEVICE FOR MANUFACTURING AN AUTOMOTIVE TIRE BEAD

[75] Inventor: Carlo Giorgetti, Rome, Italy

[73] Assignee: Bridgesteone/Firestone, Inc., Akron, Ohio

[21] Appl. No.: 624,430

[22] Filed: Dec. 7, 1990

[30] Foreign Application Priority Data

Dec. 22, 1989 [IT] Italy .................. 68170 A/89

[51] Int. Cl.⁵ ............................... B21F 37/00
[52] U.S. Cl. .................. 140/88; 245/1.5; 140/101
[58] Field of Search ............ 100/12, 13; 140/88, 140/92.94, 101; 156/136, 422, 457; 245/1.5

[56] References Cited

U.S. PATENT DOCUMENTS 1,864,216  6/1932  Poyner .................. 140/92.94
3,106,952 10/1963  Rudder .................. 245/1.5

Primary Examiner—Lowell A. Larson
Attorney, Agent, or Firm—Ernst H. Ruf

[57] ABSTRACT

A device (1) for manufacturing a tire bead (2) consisting of an annular element (3) formed from a metal wire (4) wound in such a manner as to form a number of coils packed by a flexible packing member (6) wound about the annular element (3) and having its opposite ends (7) tied in a knot (8). An annular mandrel (9) on the device (1) defines a first annular duct (38) for forming the annular element (3), and a second duct (39) coiled about the first duct (38). The mandrel (9) is connected to a pneumatic knotting machine (10) having an input duct (62) and an output duct (63) defining the two halves of a flat knot (64) and communicating respectively with the inlet (46) and outlet (47) of the second duct (39).

20 Claims, 4 Drawing Sheets

DEVICE FOR MANUFACTURING AN AUTOMOTIVE TIRE BEAD

TECHNICAL FIELD

The present invention relates to a device for manufacturing an automotive tire bead.

BACKGROUND OF THE ART

In particular, the present invention relates to a device for manufacturing a bead as described and claimed in Italian Patent application No. 68170/A-89 filed concurrently with the present Application, the content of which is incorporated fully herein by reference, and which relates to an automotive tire bead consisting of a substantially circular-section annular element formed from a continuous metal wire, generally a continuous metal cable, wound in such a manner as to form a number of packed coils. Said coils are arranged over the substantially circular section of said annular element according to a predetermined law, program or sequence and are held together by an outer flexible packing member of heat-shrinkable material coiled or wound about said annular element and the opposite ends of which are connected together.

DISCLOSURE OF THE INVENTION

The aim of the present invention is to provide a device enabling straightforward, fast, and fully-automatic manufacture of the noted bead. With this aim in view, according to the present invention, there is provided a device for manufacturing an automotive tire bead comprising an annular element consisting of a number of coils formed from a bare metal wire; and a flexible packing member coiled about said annular element and the opposite ends of which are tied in a knot; said device being characterized by the fact that it comprises an annular mandrel defining a first annular duct for forming said annular element, and a second duct having an inlet and an outlet and wound about said first duct; and a pneumatic knotting machine connected to said mandrel and having an input and output duct interlaced so as to define the two portions of a flat knot; said input and output ducts communicating respectively with said inlet and said outlet of said second duct.

A non-limiting embodiment of the present invention will now be described by way of example with reference to the accompanying drawings.

BEST MODE FOR CARRYING OUT THE INVENTION

Figure 7:
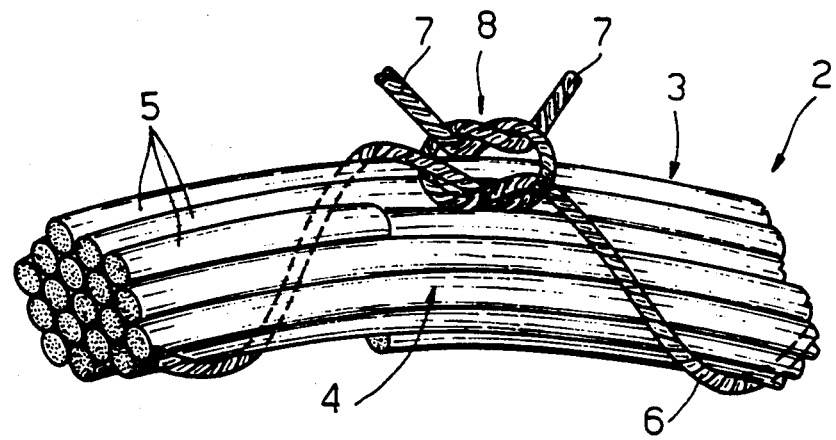
FIG. 7 shows a partial view, in perspective, of a bead formed using the FIG. 1 device.

Number 1 in FIGS. 1 to 6 indicates a device for manufacturing an automotive tire bead 2 (FIG. 7). As shown in FIG. 7, said bead 2 is a "program" bead as described in Italian Patent Application No. 68168/A-89 filed concurrently with the present Application and the content of which is fully incorporated herein in the interest of full disclosure. Bead 2 consists of a substantially circular-section annular element 3 formed from a continuous bare metal wire 4 wound in such a manner as to form a number of packed coils 5.

These coils are held together by a portion of an outer flexible packing member 6 of heat-shrinkable material, e.g. polyamide, wound about annular element 3 and the opposite ends 7 of which are tied in a flat knot 8.

As shown in FIGS. 1 to 6, device 1 comprises a mandrel 9 for forming bead 2; and a pneumatic knotting machine 10 connected to mandrel 9 for automatically tying knot 8. As shown, particularly in FIG. 3, mandrel 9 comprises an inner ring 11, and an outer ring 12 (FIG. 1) connected to knotting machine 10. Inner ring 11 is of substantially rectangular section, and is defined by a cylindrical outer surface 13, the opposite axial ends of which blend with two lateral annular surfaces 14 via two opposed truncated-cone surfaces 15. Outer ring 12 is also of rectangular section, and defined by a cylindrical outer surface 16, and a cylindrical inner surface 17 (FIG. 1) coaxial with surface 16 and having an annular cavity 18 engaged by a peripheral outer portion of inner ring 11, and having an inner surface mating with the outer surface of said inner ring 11.

Inner ring 11 consists of two coaxial annular bodies 19 and 20 arranged laterally contacting each other along respective annular mating surfaces 21 and 22, each comprising an outer annular portion 23 extending perpendicular to the axis of mandrel 9 from the center line of surface 13, an inner annular portion 24 parallel to but offset axially in relation to portion 23, and an intermediate, truncated-cone, centering portion 25 for connecting portions 23 and 24.

Figure 5:
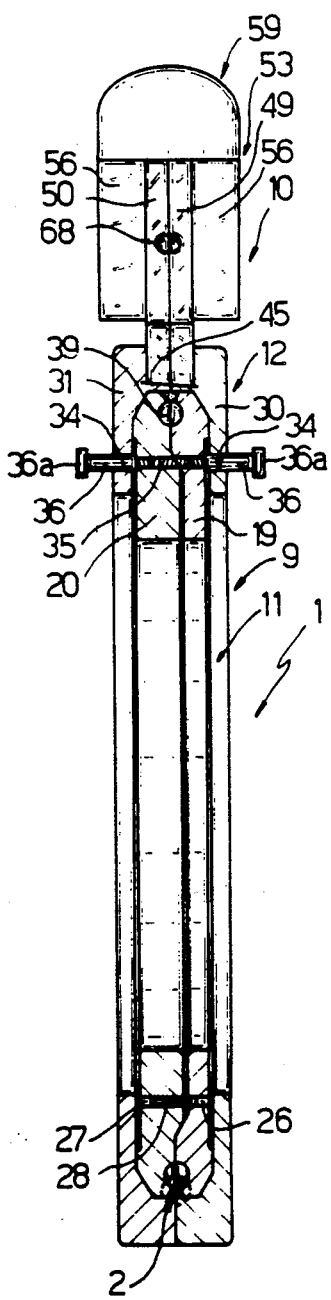
FIGS. 4 to 6 show the FIG. 1 device in three operating positions.
Figure 4:
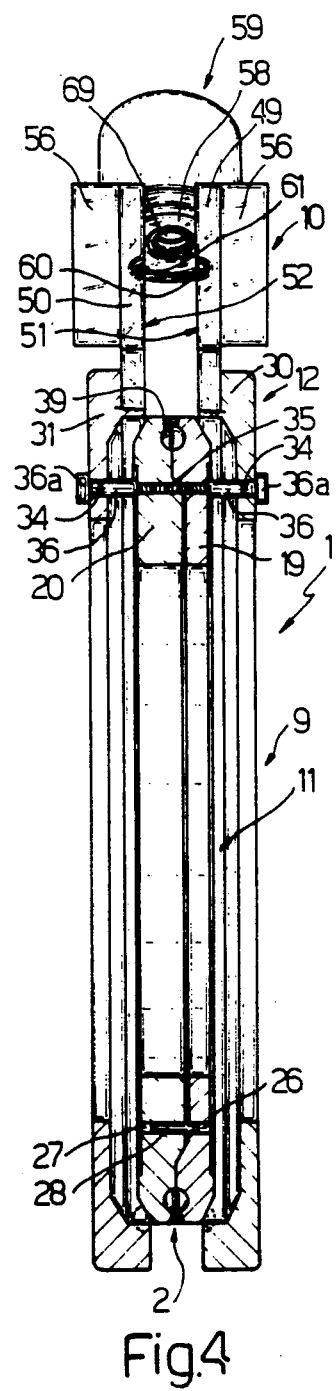
Figure 6:
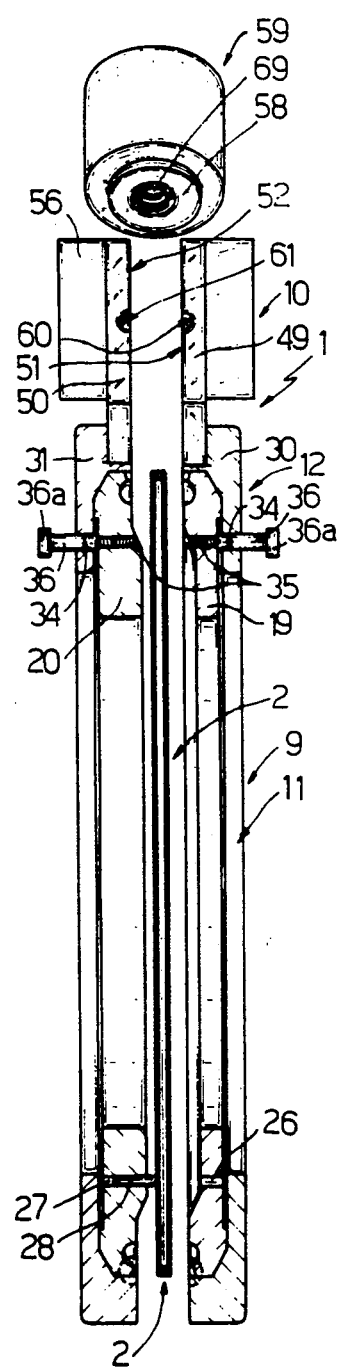

As shown in FIGS. 4 to 6, annular bodies 19 and 20 present respective numbers of axial through holes 26 and 27 equally spaced about inner ring 11. In particular, each hole 26 is coaxial with a respective hole 27, and each pair of coaxial holes 26 and 27 houses a respective pin 28. Each pin 28 is force fitted inside respective hole 27, and engages respective hole 26 in sliding manner so as to enable mutual axial displacement of annular bodies and 20, while at the same time ensuring said annular bodies 19 and 20, when mated, are secured angularly integral with or locked to each other.

Figure 1:
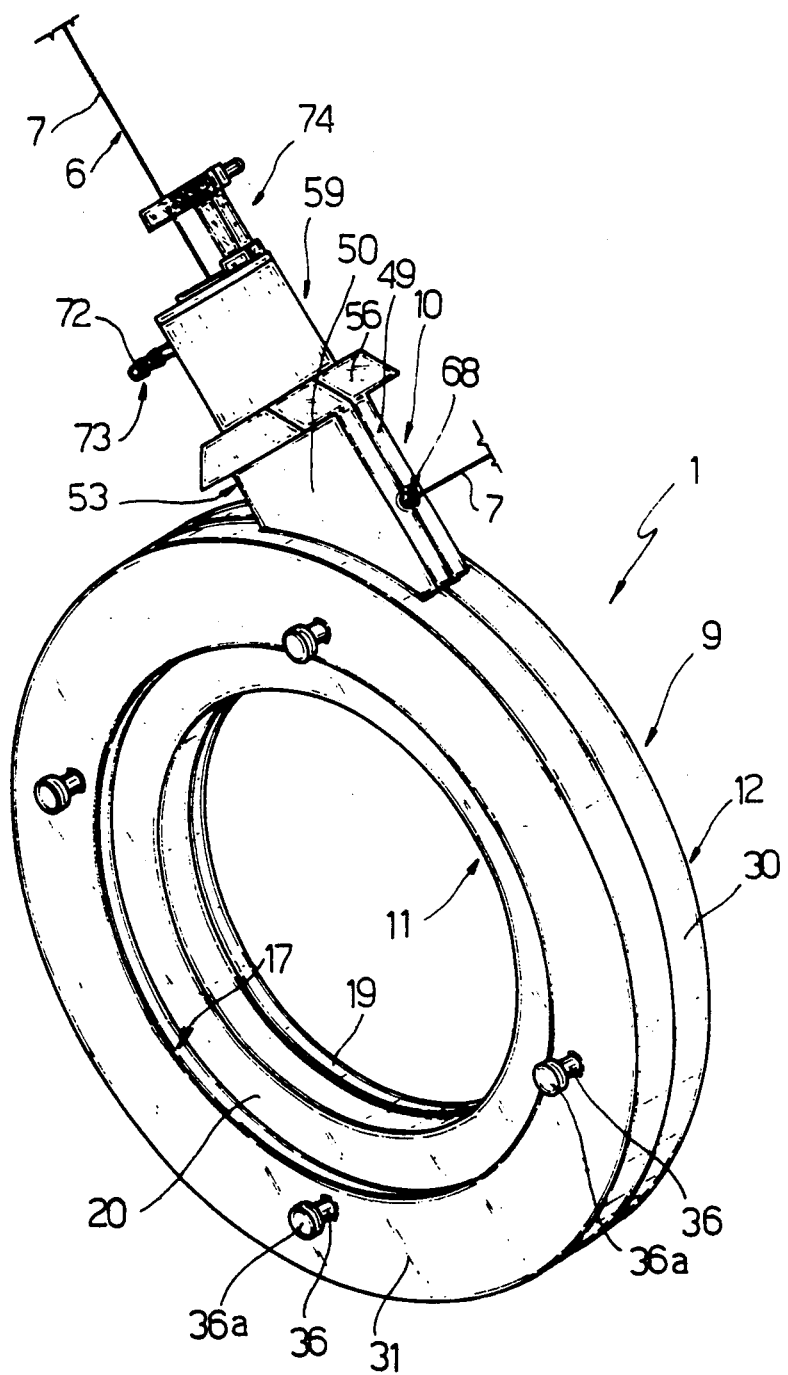
FIG. 1 shows a view, in perspective, of a preferred embodiment of the device according to the present invention.
Figure 2:
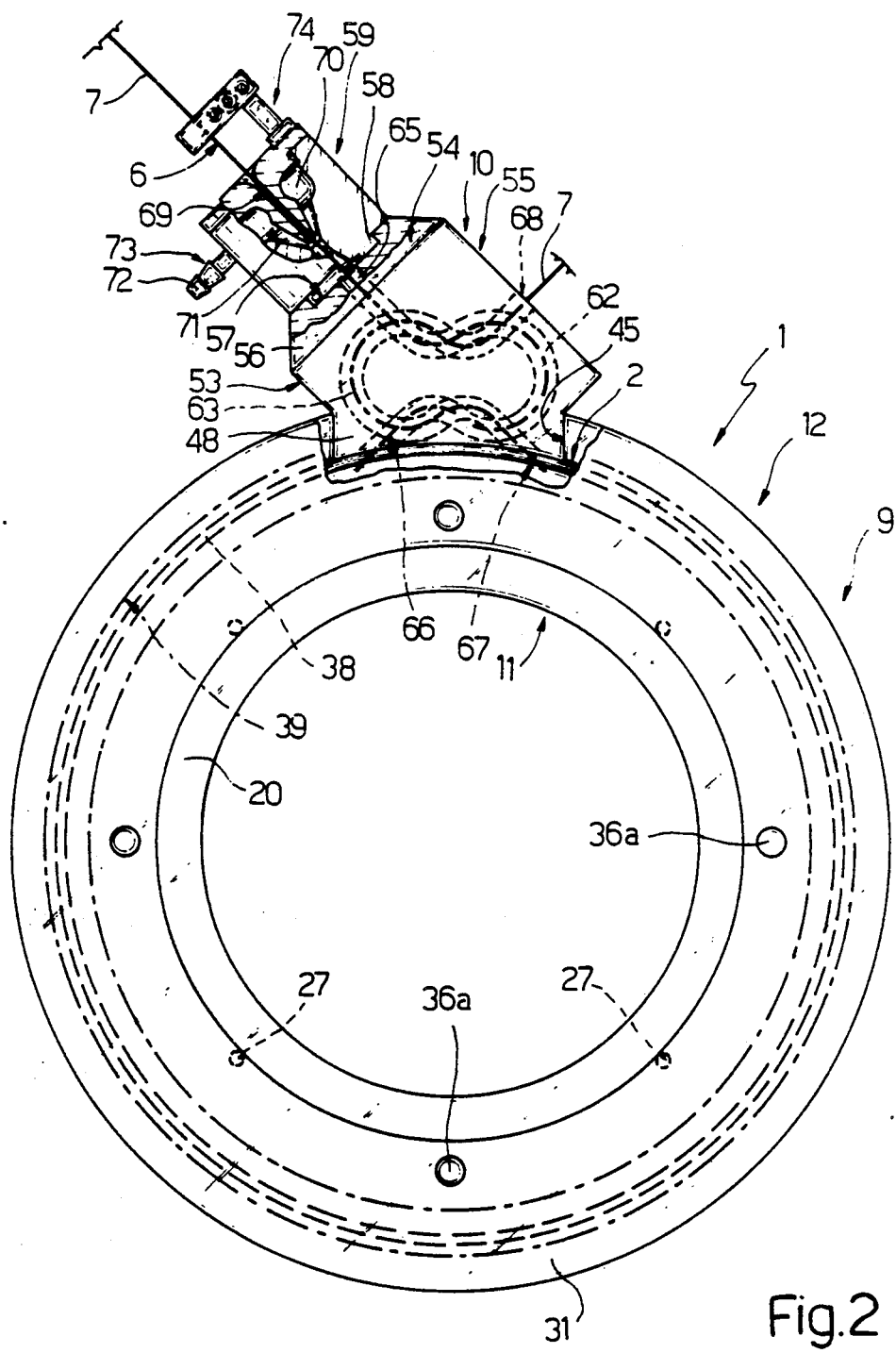
FIG. 2 shows a side view of the FIG. 1 device.
Figure 3:
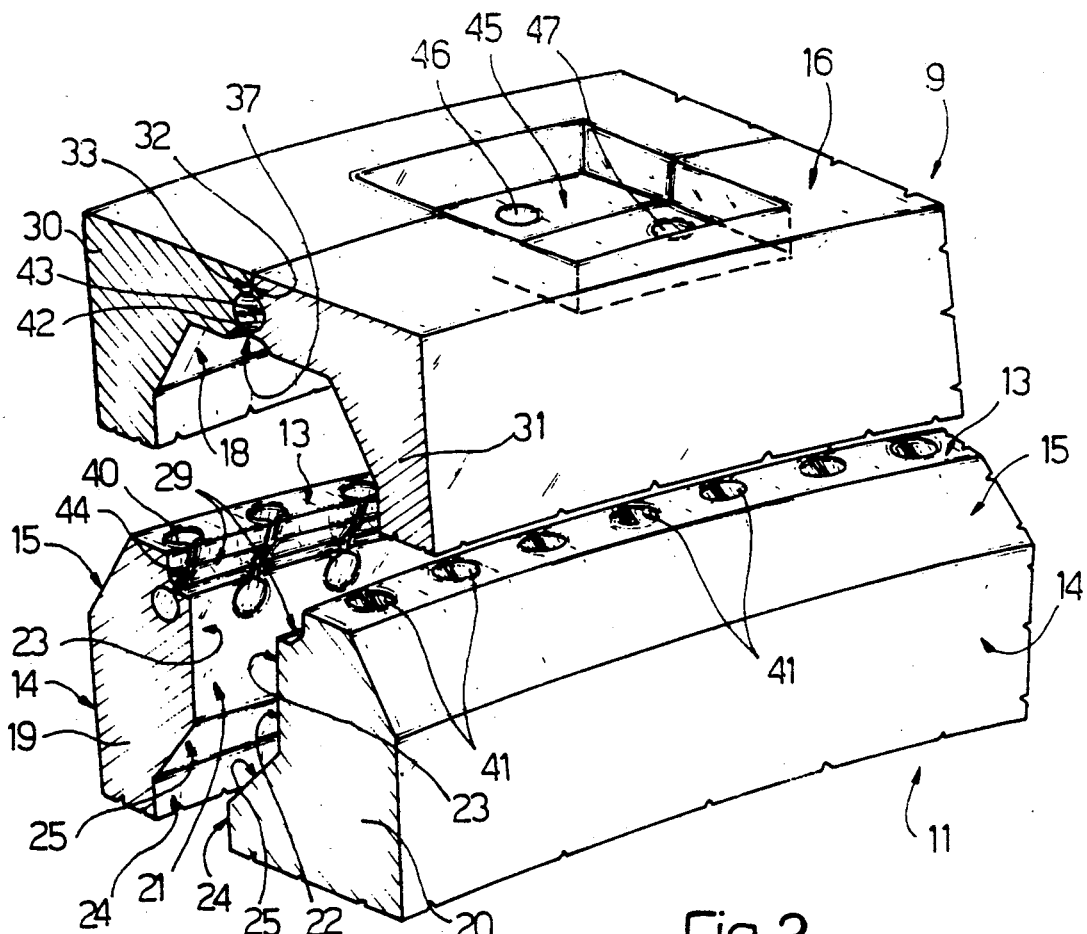
FIG. 3 shows a partially-exploded view of a portion, in perspective, of the FIG. 1 device.

As shown in FIG. 3, surface 13 presents an annular groove 29 of substantially semicircular section, the diametrical plane of which coincides with the plane of annular portions 23. In other words, a first transverse half of groove 29 is formed on annular body 19, the second half of which is formed on annular body 20. As in the case of ring 11, outer ring 12 also consists of two coaxial annular bodies 30 and 31 arranged laterally contacting in each other along respective annular surfaces 32 and 33 extending perpendicular to the center line of surfaces 16 and 17.

As shown in FIGS. 4 to 6, annular bodies 30 and 31 present respective numbers of axial through holes 34 equally spaced about outer ring 12. In particular, each hole 34 is coaxial with a respective internally-threaded hole 35 formed axially through respective adjacent annular bodies 19, 20, and each pair of coaxial holes 34 and 35 houses a pin 36 having a threaded end screwed inside a respective hole 35, and a cylindrical portion engaging a respective hole 34 in a sliding manner and terminating in an external pin head 36a.

Pins 36 enable annular bodies 19 and 20 to support respective annular bodies 30 and 31, and act as a guide enabling axial displacement of each annular body 30, 31 in relation to respective annular bodies 19 and 20. In particular, the length of each pin 36 is such as to enable axial displacement of respective one of annular bodies 30 and 31 in relation to respective one of annular bodies 19 and 20 by a distance at least equal to the section radius of grooves 29, and between a first position, wherein each annular body 30, 31 is arranged with the respective portion of annular groove 37 coinciding with the portion of annular groove 29 on respective annular body 19, 20, and a second position, wherein each annular body 30, 31 is arranged with the respective portion of annular groove 37 offset by at least one radius in relation to the portion of annular groove 29 on respective annular body 19, 20.

With reference to FIG. 3, the bottom of cavity 18 on outer ring 12 presents an annular groove 37 of substantially semicircular section, the diametrical plane of which coincides with the plane of mated surfaces 32 and 33. In other words, a first transverse half of groove 37 is formed on annular body 30, the second half of which is formed on annular body 31. When mated, said grooves 29 and 37 define an annular duct 38 (FIG. 2) for receiving annular element 3.

As shown in FIG. 3, inside mandrel 9 there is formed a second duct 39 coiling about duct 38 and comprising a number of segments 40 formed on annular body 19, a number of segments 41 formed on annular body 20, a number of segments 42 formed on annular body 30, and a number of segments 43 formed on annular body 31. Each of segments 40, 41, 42 and 43 communicates with duct 38 via a respective axial slot 44 (only one of which is shown in FIG. 3).

Through surface 16 on outer ring 12, a cavity 45 (FIGS. 2 and 3) is formed symmetrical with annular bodies 30 and 31, i.e., extending partly over annular body 30 and partly over annular body 31. Cavity 45 is of such a depth as to intersect duct 39, which communicates with cavity 45 via at least two holes 46 and 47 (FIG. 3) in turn communicating respectively with duct segments 42 and 43 and respectively defining the inlet and outlet of duct 39.

As shown in FIG. 2 and FIGS. 4 to 6, cavity 45 is engaged by an appendix 48 on pneumatic knotting machine 10, consisting of two identical parallel plates 49 and 50 normally contacting each other along respective flat surfaces 51 and 52, and engaging respective portions of cavity 45. In the contacting position, plates 49 and 50 define a body 53 defined, on the opposite side to that supporting appendix 48, by two flat lateral surfaces 54 and 55 perpendicular to each other and parallel to the axis of outer ring 12. Surface 54 of body 53 presents a flange 56 consisting of two portions respectively integral with plates 49 and 50, and having, on the opposite side to that facing surface 54, a cylindrical cavity 57 engaged in removable manner by a cylindrical end appendix 58 of an injector 59.

Plates 49 and 50 are respectively integral with annular bodies 30 and 31, and present, on surfaces 51 and 52, respective grooves 60 and 61 defining, when surfaces 51 and 52 are placed together, an input duct 62 and output duct 63 interlaced in such a manner as to define the two halves of a flat knot 64. In particular, input duct 62 extends from an inlet hole 65, formed centrally on the bottom of cavity 57 on body 53, to an outlet hole 66 opening on to the end of appendix 58 and facing hole 46; whereas output duct 63 extends from an inlet hole 67, opening onto the end of appendix 58 and facing hole 47, to an outlet hole 68 formed centrally on surface 55 of body 53.

Injector 59 consists of a cylindrical body coaxial with appendix 58 and has an axial through hole 69 facing hole 65 when appendix 58 is engaged inside cavity 57. Inside injector 59, there is formed an annular duct 70 surrounding hole 69 and communicating, on one side, with the midpoint of hole 69 via a conical tubular nozzle 71 directed towards appendix 58, and, on the other, with a radial duct 72 constituting the output end portion of a device 73 supplying pressurized fluid, preferably compressed air. A fast grip 74 is connected integral with the end of injector 59 opposite the end supporting appendix 58.

Formation of bead 2 using device 1 will be described with reference to FIGS. 4 to 6. As shown in FIG. 4, to begin with, annular bodies 19 and 20 are placed together so as to define inner ring 11 together with respective groove 29. Inner ring 11 is preferably mounted on a rotary support (not shown) designed to turn annular bodies 19 and 20 about their axis, and to axially displace same in relation to each other and between a first or work position (FIG. 4) wherein annular surfaces 21 and 22 are arranged contacting each other, and a second or unloading position (FIG. 6) wherein surfaces 21 and 22 are separated by a distance at least enabling withdrawal of pins 28 from respective holes 26, and the formation, between the outer free ends of pins 28 and annular body 19, of a passage at least equal in width to the section diameter of bead 2.

Wire 4, normally fed off a reel (not shown), is fed inside groove 29 via a known feed device (not shown) and secured, in any convenient manner, with its end contacting a given point on the surface of groove 29. Said feed device (not shown) is normally controlled by a computer (not shown), and moves back and forth, as controlled by said computer and according to a given program, in a direction parallel to the axis of ring 11, so as to form, subsequent to the rotation of ring 11 about its axis, coils 5 (FIG. 7) arranged in layers according to a given sequence, and, consequently, annular element 3, the circular section of which is housed half inside and half projecting outwardly from groove 29.

Wire 4 is then cut by any known type of cutting device (not shown), and groove 29 closed by outer ring 12. For this purpose, annular bodies 30 and 31, which are initially separated with their outer lateral surfaces contacting heads 36a of pins 36, are brought axially together (FIG. 5) along pins 36 so as to mate surfaces 32 and 33 and so define groove 37, which, together with groove 29, defines annular duct 38 for annular element 3. At the same time, the mating of annular bodies 19 and 20 and annular bodies 30 and 31, as shown in FIG. 5, results in the formation of helical duct 39, in the mating of plates 49 and 50 along surfaces 51 and 52 thus forming ducts 62 and 63, and in engagement of appendix 58 of injector 59 inside cavity 57.

Outer Flexible packing member 6, which, as will be explained in more detail later, is originally arranged with its end portions 7 fully occupying hole 69 on injector 59 and locked axially in relation to injector 59 by first grip 74, is released by first grip 74, and compressed air is supplied to injector 59 along duct 72. Compressed air is fed, via duct 72, into annular duct 70 and out through nozzle 71 into hole 69, thus drawing flexible packing member 6 along input duct 62 on knotting machine 10, duct 39 on mandrel 9, and output duct 63 on knotting machine 10, until one end portion 7 comes out of hole 68.

At this time, said end portion 7 is engaged by a second grip (not shown); annular bodies 30 and 31 are moved axially outwardly in relation to inner ring 11 into the detached position in FIG. 4, thus detaching plates 49 and 50; first grip 74 is closed; injector 59 is detached axially from knotting machine 10 (FIG. 6) thus drawing flexible packing member 6; and, at the same time, said end portion 7 is drawn outwardly by said second grip (not shown). The simultaneous actions resulting from detachment of injector 59 from knotting machine 10 and the pull exerted by said second grip (not shown) on the said end portion 7 of flexible packing member 6 projecting from hole 68 provide for tying knot 8 and so completing bead 2.

Flexible packing member 6 is then cut, by a known cutting device (not shown), at the end of hole 69 facing knotting machine 10, and annular bodies 19 and 20 are moved axially in relation to each other, so as to withdraw pins 28 from holes 27 (FIG. 6), and until they come to rest on respective annular bodies 30 and 31, thus releasing finished bead 2. Annular bodies 19 and 20 are then restored to the mated position in FIG. 4, and injector 59 is moved axially towards mandrel 9 into the starting position for commencing a new cycle.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. A device for manufacturing an automotive tire bead of the type having an annular element consisting of a number of coils formed from a bare metal wire, and an outer flexible packing member having a pair of opposite ends coiled about said annular element, said opposite ends being tied in a knot; said device including an annular mandrel defining a first annular duct for forming said annular element, and a second duct having an inlet hole and an outlet hole extending concentrically about said first duct; and a pneumatic knotting machine connected to said mandrel having an input duct and an output duct interlaced so as to define two portions of the knot, with said input and output ducts communicating respectively with said inlet hole and said outlet hole of said second duct.

2. A device as defined in claim 1 in which said mandrel is formed with an external cavity of such a depth as to intercept said second duct at said inlet hole and said outlet hole of said second duct; and in which said cavity is engaged by a portion of said knotting machine to provide the communication between the outlet hole of said input duct and the inlet hole of said output duct.

3. A device as defined in claim 2 including an injector having a nozzle for injecting pressurized fluid, and a through hole for said flexible packing member; and in which said through hole communicates at a mid point with said nozzle, with said nozzle being directed towards an outlet end of said through hole.

4. A device as defined in claim 3 in which the output duct of said knotting machine has an outlet hole at its outer extremity, and in which said input duct of the knotting machine presents an inlet hole communicating with the outlet end of said through hole on said injector.

5. A device as defined in claim 4 in which the mandrel comprises an inner ring having an outer annular groove and an outer ring having an inner annular groove facing said outer annular groove so as to define therewith said first duct.

6. A device as defined in claim 5 in which said second duct extends through said inner ring and said outer ring; and in which said cavity is formed on said outer ring.

7. A device as defined in claim 6 in which said inner ring comprises two first parallel coaxial annular bodies, each bearing a respective portion of said outer annular groove and moveable axially in relation to each other between a first position wherein said two first annular bodies are arranged contacting each other so as to define said outer annular groove, and a second position wherein said two first annular bodies are separated so as to define a passage at least equal in width to the thickness of said bead.

8. A device as defined in claim 7 in which locking means is provided between the two first annular bodies are angularly locking said bodies in said first position.

9. A device as defined in claim 8 in which the outer ring comprises two second annular bodies parallel to each other and coaxial with said first annular bodies; in which each of said second annular bodies bears against a respective portion of said inner annular groove and is connected to a respective one of said first annular bodies so as to move axially in relation thereto between a third and fourth position, wherein each of said second annular bodies is arranged to present said respective portion of said inner annular groove coinciding with, and respectively offset by, at least one radius in relation to the portion of said outer annular groove on a respective one of said first annular bodies.

10. A device as defined in claim 9 in which the mandrel also comprises guide means on each of said first annular bodies for axially guiding said respective second annular bodies between said third and fourth positions.

11. A device as defined in claim 10 in which the guide means comprises a number of axial through holes formed through each of said second annular bodies, and in which a number of axial pins is carried on each of said first annular bodies and extend in a sliding manner through a respective one of said axial through holes; and in which each of said pins have a head which cooperates with and locks said respective ones of said second annular bodies in said fourth position.

12. A device as defined in claim 11 in which the external cavity is formed partly on each of said two second annular bodies; in which said pneumatic knotting machine comprising two plates engaging a respective portion of said cavity, each being integral with a respective one of said second annular bodies so as to move therewith between a mated position wherein said two plates contact each other along respective lateral surfaces, and a detached position.

13. A device as defined in claim 12 in which each of said plates presents on said respective lateral surfaces, a groove which defines together with the other of said grooves, said input duct and said output duct.

14. A device as defined in claim 5 in which said inner ring comprises two first parallel coaxial annular bodies, each bearing a respective portion of said outer annular groove and axially moveable in relation to each other between a first position wherein said two first annular bodies are arranged contacting each other so as to define said outer annular groove, and a second position wherein said two first annular bodies are separated so as to define a passage at least equal in width to the thickness of said bead.

15. A device as defined in claim 14 in which the locking means is provided between said two first annular bodies for angularly locking said bodies in said first position.

16. A device as defined in claim 15 in which the outer ring comprises two second annular bodies parallel to each other and coaxial with said first annular bodies; in which each of said second annular bodies bears against a respective portion of said inner annular groove and is connected to a respective one of said first annular bodies so as to move axially in relation thereto between a third and fourth position, wherein each of said second annular bodies is arranged to present said respective portion of said inner annular groove coinciding with and respectively offset by, at least one radius in relation to the portion of said outer annular groove on a respective one of first annular bodies.

17. A device as defined in claim 16 in which the mandrel includes guide means on each of said first annular bodies for axially guiding said respective second annular bodies between said third and fourth positions.

18. A device as defined in claim 17 in which the guide means comprises a number of axial through holes formed through each of said second annular bodies and a number of axial pins carried on each of said first annular bodies, each of said pins extending in a sliding manner through a respective one of said axial through holes; and in which each of said pins have a head which cooperates with and locks said respective ones of said second annular bodies in said fourth position.

19. A device as defined in claim 18 in which the external cavity is formed partly on each of said two second annular bodies; in which said pneumatic knotting machine comprises two plates engaging a respective portion of said cavity, each of said plates being integral with a respective one of said second annular bodies so as to move therewith between a mated position wherein said two plates contact each other along respective lateral surfaces, and a detached position.

20. A device as defined in claim 19 in which each of said plates presents on said respective lateral surfaces, a groove which defines with the other of said lateral surface grooves, said input duct and said output duct.

* * * * *